United States Patent
Davydov et al.

(10) Patent No.: US 9,854,490 B2
(45) Date of Patent: Dec. 26, 2017

(54) RANK INDICATOR INHERITANCE FOR SUBFRAME RESTRICTED CHANNEL STATE INFORMATION REPORTING

(71) Applicant: Intel Corporation, Santa Clara, CA (US)

(72) Inventors: Alexei Davydov, Nizhny Novgorod (RU); Ilya Bolotin, Nizhny Novgorod (RU); Alexander Maltsev, Nizhny Novgorod (RU); Gregory V. Morozov, Nizhny Novgorod (RU); Debdeep Chatterjee, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 17 days.

(21) Appl. No.: 14/759,109

(22) PCT Filed: Dec. 12, 2013

(86) PCT No.: PCT/US2013/074639
§ 371 (c)(1),
(2) Date: Jul. 2, 2015

(87) PCT Pub. No.: WO2014/107279
PCT Pub. Date: Jul. 10, 2014

(65) Prior Publication Data
US 2015/0341817 A1    Nov. 26, 2015

Related U.S. Application Data

(60) Provisional application No. 61/748,706, filed on Jan. 3, 2013.

(51) Int. Cl.
*H04W 36/14*     (2009.01)
*H04W 24/10*     (2009.01)
(Continued)

(52) U.S. Cl.
CPC ........... *H04W 36/14* (2013.01); *H04B 7/024* (2013.01); *H04B 7/0486* (2013.01);
(Continued)

(58) Field of Classification Search
CPC ......... H04W 72/0413; H04W 56/0095; H04W 24/10; H04W 28/0268; H04W 84/12;
(Continued)

(56) References Cited

U.S. PATENT DOCUMENTS

2011/0149765 A1    6/2011    Gorokhov et al.
2012/0287799 A1    11/2012   Chen et al.
(Continued)

FOREIGN PATENT DOCUMENTS

WO    2012094608 A2    7/2012
WO    2012148446 A1    11/2012

OTHER PUBLICATIONS

International Search Report and Written Opinion received for PCT Patent Application No. PCT/US2013/074639, dated Mar. 24, 2014, 9 pages.
(Continued)

*Primary Examiner* — Kwang B Yao
*Assistant Examiner* — Syed M Bokhari
(74) *Attorney, Agent, or Firm* — Grossman, Tucker, Perreault & Pfleger, PLLC (57) ABSTRACT

Generally, this disclosure provides devices, systems and methods for subframe restricted Channel State Information (CSI) reporting with Rank Indicator (RI) inheritance. A User Equipment (UE) device may include an RI generation module to generate RIs based on a received CSI configuration from an evolved Node B (eNB) of a serving cell of the UE. The UE may also include an RI Reference Process CSI generation module to generate a first Reference CSI including a first selected RI of the generated RIs, the first selection
(Continued)

based on a first subframe set of the received CSI configuration, and to generate a second Reference CSI including a second selected RI of the generated RIs, the second selection based on a second subframe set of the received CSI configuration. The UE may further include a Linked Process CSI generation module to generate a linked CSI including an inherited RI from the first Reference CSI.

24 Claims, 6 Drawing Sheets (51) Int. Cl.
| | |
|---|---|
| H04B 7/06 | (2006.01) |
| H04B 7/04 | (2017.01) |
| H04J 11/00 | (2006.01) |
| H04W 72/04 | (2009.01) |
| H04B 7/024 | (2017.01) |
| H04W 56/00 | (2009.01) |
| H04W 72/00 | (2009.01) |
| H04W 88/08 | (2009.01) |
| H04L 29/06 | (2006.01) |
| H04W 36/00 | (2009.01) |
| H04W 48/08 | (2009.01) |
| H04W 68/00 | (2009.01) |
| H04W 28/02 | (2009.01) |
| H04W 36/22 | (2009.01) |
| H04W 48/16 | (2009.01) |
| H04W 52/02 | (2009.01) |
| H04W 76/02 | (2009.01) |
| H04L 12/46 | (2006.01) |
| H04L 29/12 | (2006.01) |
| H04W 12/02 | (2009.01) |
| H04W 88/06 | (2009.01) |
| H04W 84/12 | (2009.01) |
| H04L 5/00 | (2006.01) |
| H04W 88/16 | (2009.01) |
| H04W 8/08 | (2009.01) |

(52) U.S. Cl.
CPC ......... *H04B 7/0626* (2013.01); *H04B 7/0632* (2013.01); *H04J 11/0053* (2013.01); *H04L 5/0053* (2013.01); *H04L 12/4641* (2013.01); *H04L 61/2007* (2013.01); *H04L 63/304* (2013.01); *H04L 63/306* (2013.01); *H04W 12/02* (2013.01); *H04W 24/10* (2013.01); *H04W 28/0268* (2013.01); *H04W 36/0005* (2013.01); *H04W 36/0055* (2013.01); *H04W 36/22* (2013.01); *H04W 48/08* (2013.01); *H04W 48/16* (2013.01); *H04W 52/0222* (2013.01); *H04W 56/005* (2013.01); *H04W 56/0015* (2013.01); *H04W 56/0095* (2013.01); *H04W 68/00* (2013.01); *H04W 72/005* (2013.01); *H04W 72/042* (2013.01); *H04W 72/0413* (2013.01); *H04W 76/02* (2013.01); *H04W 76/021* (2013.01); *H04W 76/023* (2013.01); *H04W 88/08* (2013.01); *H04L 5/0057* (2013.01); *H04W 8/082* (2013.01); *H04W 36/0011* (2013.01); *H04W 84/12* (2013.01); *H04W 88/06* (2013.01); *H04W 88/16* (2013.01); *Y02B 60/50* (2013.01)

(58) Field of Classification Search
CPC ... H04W 88/06; H04B 7/0486; H04B 7/0626; H04B 7/0632; H04J 11/0053; H04L 5/0057
USPC .......................... 370/252, 329, 328; 375/267
See application file for complete search history.

(56) References Cited

U.S. PATENT DOCUMENTS

| | | | | |
|---|---|---|---|---|
| 2013/0288608 | A1* | 10/2013 | Fwu ...................... | H04W 72/02 455/63.1 |
| 2014/0177745 | A1* | 6/2014 | Krishnamurthy .... | H04B 7/0413 375/267 |
| 2014/0369244 | A1* | 12/2014 | Han .................. | H04W 52/0225 370/280 |
| 2015/0271812 | A1* | 9/2015 | Nam ..................... | H04L 1/0003 370/329 |
| 2016/0013900 | A1* | 1/2016 | Lee ....................... | H04W 24/00 370/328 |

OTHER PUBLICATIONS

3GPP TS 36.213, LTE; Evolved Universal Terrestrial Radio Access (E-UTRA); Physical layer procedures (Release 11), v.11.1.0, Dec. 2012.
3GPP TSG RAN WG1 Meeting #71, ZTE, Reference process for rank indicator under periodic CSI feedback modes for CoMP, Agenda Item 6.2.2.4.2, Nov. 12-16, 2012, New Orleans, USA.
Extended European Search Report issued in European Application No. 13870229.5, dated Aug. 8, 2016.
DL Comp Rapporteur (Samsung): "RRC Parameters for Downlink CoMP", 3GPP Draft; RI-124669 DL Comp RRC Parameters, 3rd Generation Partnership Project (3GPP), Mobile Competence Centre 650, Route Des Lucioles ; F-06921 Sophia-Antipolis Cedex ; France 1-15, vol. Ran WG1, No. San Diego, USA; Oct. 8, 2012-Oct. 12, 2012, Oct. 26, 2012 (Oct. 26, 2012), XP050662528, Retrieved from the Internet: URL:http: //www.3gpp/org/ftp/tsg_ran/WGI_RLI/ TSGRI_70b/Docs/, [retrieved on Oct. 26, 2012], table 3, section 2.
Samsung: "Remaining Details of Aperiodic CSI Multiplexing", 3GPP Draft; RI-124919 Remaining Details of Aperiodic CSI Multiplexing—Final, 3rd Generation Partnership Project (3GPP), Mobile Competence Centre ; 650, Route Des Lucioles ; F-06921 Sophia-Antipolis, vol. RAN WG1, No. New Orleans, USA; Nov. 12, 2012-Nov. 16, 2012, Nov. 3, 2012 (Nov. 3, 2012), XP050662856, Retrieved from the Internet: URL:http://www.3gpp. org/ftp/tsg_ran/WGI_RLI/TSGRI_71/Docs/, [retrieved on Nov. 3, 2012], sections 2, 3, 5, 6.
Ericsson et al: "CSI Process Inheritance for Periodic Feedback Modes"; 3Gpp Draft; 1-125202 Inheritance on PUCCH, 3rd Generation Partnership Project (3GPP), Mobile Competence Centre ; 650, Route Des Lucioles; F-06921 Sophia-Antipolis Cedex; France, vol. RAN WG1, No. New Orleans, USA; Nov. 12, 2012-Nov. 16, 2012, Nov. 3, 2012 (Nov. 3, 2012), XP050663044, Retrieved from the Internet: URL:http: //www.3gpp.org/ftp/tsg_ran/WGI_RLI/ TSGRI_71/Docs/, [retrieved on Nov. 3, 2012], sections 2, 3.

* cited by examiner

RANK INDICATOR INHERITANCE FOR SUBFRAME RESTRICTED CHANNEL STATE INFORMATION REPORTING

CROSS-REFERENCE TO RELATED APPLICATIONS

The present patent application is related to and claims priority to U.S. Provisional Patent Application Ser. No. 61/748,706, filed Jan. 3, 2013, the contents of which are incorporated herein by reference in their entirety.

FIELD

The present disclosure relates to Channel State Information (CSI) reporting, and more particularly, to Rank Indicator (RI) inheritance for subframe restricted CSI reporting.

BACKGROUND

Wireless networks, for example Long Term Evolution (LTE) and LTE-Advanced (LTE-A) networks, may be heterogeneous networks that include "macro cells," providing higher power/wider area coverage, and "small cells," providing lower power/reduced area coverage. Small cells may include "femto cells," suitable for home or office coverage and "pico cells," for larger indoor environments such as shopping centers. A base station, for example an evolved Node B (eNB) transceiver, may be associated with each cell to provide network access to wireless mobile devices, for example User Equipment (UEs), passing through that cell coverage area.

At any given time, one of the eNBs in the wireless network may act as a serving cell eNB for a UE while other eNBs from neighboring or overlapping cells may be a source of interference for that UE. Various techniques may be employed to mitigate these interference effects. For example, under the Enhanced Inter-Cell Interference Coordination (EICIC) technique, a macro cell eNB may blank out or mute transmission during selected time periods or subframes so that neighboring cells may use them with reduced interference. In another technique, known as Coordinated Multipoint (CoMP), some neighbor interfering cell eNBs may blank out selected subframes or Physical Resource Blocks (PRBs) so that other neighboring cells may use them with reduced interference.

In a wireless network system that employs both EICIC and CoMP (and/or other interference mitigation techniques), the UE may transmit or report multiple CSI signals, each associated with an inter-cell interference condition and/or eNB blanking mode. Under current system configurations, ambiguity may arise in the content of those CSI signals, particularly with regards to the RI component of the CSI.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for subframe restricted CSI reporting with RI inheritance. A UE that is operating in a wireless network system that employs both EICIC and CoMP interference mitigation techniques may be configured, by a serving cell eNB, to transmit or report multiple CSI signals, each CSI associated with an inter-cell interference condition and/or eNB blanking mode. For example, there may be one or more Reference CSI processes and Linked CSI processes, each of which may transmit one or more subframe sets. The Reference CSI may be associated with non-interfering (or eNB blanking) time periods while the Linked CSI may be associated with interfering time periods. These CSI generally include a Channel Quality Indicator (CQI), a Pre-Coding Matrix Indicator (PMI) and an RI, where the CQI and PMI are calculated based on a selected RI. Embodiments of the present disclosure provide an association between the reported RIs of the linked CSI process and those of the Reference CSI process to resolve RI ambiguities, as will be described in greater detail below.

Figure 1:
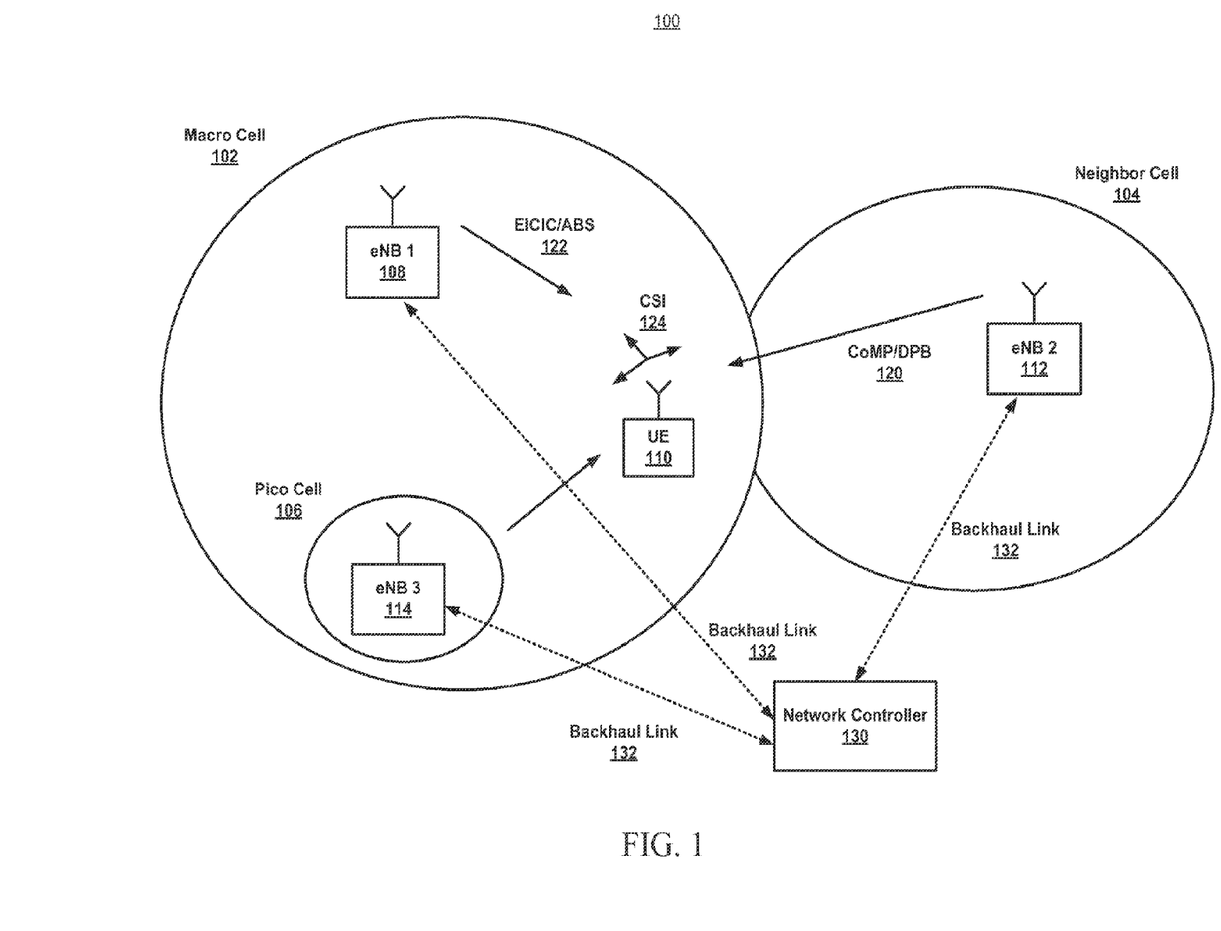
FIG. 1 illustrates a top level system diagram of one example embodiment consistent with the present disclosure.

FIG. 1 illustrates a top level system diagram 100 of one example embodiment consistent with the present disclosure. A heterogeneous wireless network 100 is shown in a simplified form to include a first macro cell eNB 108, providing macro cell coverage 102, which may be serving a UE 110. Also shown, is a neighbor cell 104 served by second eNB 112, and a pico cell 106 served by a third eNB 114. The neighbor cell 104 and the pico cell 106 may overlap with the macro cell 102 to some extent. UE 110 may be located near the edge of macro cell 102 where it may be subject to interference from eNB 112 and/or eNB 114. A network controller 130 may be configured to communicate with eNBs 108, 112, 114 over backhaul links 132 so that the eNBs may coordinate transmission and blanking, under the various interference mitigation techniques including EICIC and CoMP.

Macro cell eNB 108 may be configured to implement EICIC 122, which may, for example employ Almost Blank Subframes (ABS), where the macro cell eNB 108 blanks transmission on selected subframes so that the neighboring cell eNBs, for example 112 and 114, may transmit during those time periods with reduced interference from macro cell eNB 108. UE 110 may be configured to transmit or report CSI 124 corresponding to different subframes (e.g., ABS and non-ABS) through the use of subframe set configuration.

Neighbor cell eNB 112 may be configured to implement CoMP 120, which may, for example employ Dynamic Point Blanking (DPB), where the neighbor cell eNB 112 blanks transmission on selected PRBs of the subframes so that other neighboring cell eNBs, for example pico cell eNB 114, may transmit during those time periods with reduced interference from neighbor cell eNB 112. UE 110 may be configured to transmit or report CSIs 124 of one or more CSI processes corresponding to different transmission assumptions for the neighbor cell eNB 112.

UE 110 may be configured to transmit or report CSIs 124 to the serving cell eNB using RI inheritance and subframe sets as will be described in greater detail below.

While this is a simplified example, for illustration purposes, it will be appreciated that in practice any configuration of UEs and eNBs of various types, including macro cells, pico cells and femto cells, may be deployed. The wireless network may be a heterogeneous network including New Carrier Type (NCT) and non-NCT eNBs which may further be classified as standalone or non-standalone configurations. The wireless network may comply with, or otherwise be compatible with, the Third Generation Partnership Project (3GPP) Long Term Evolution (LTE) and/or LTE-Advanced (LTE-A) based wireless network standard, including current, previous and future versions of that standard.

Figure 2:
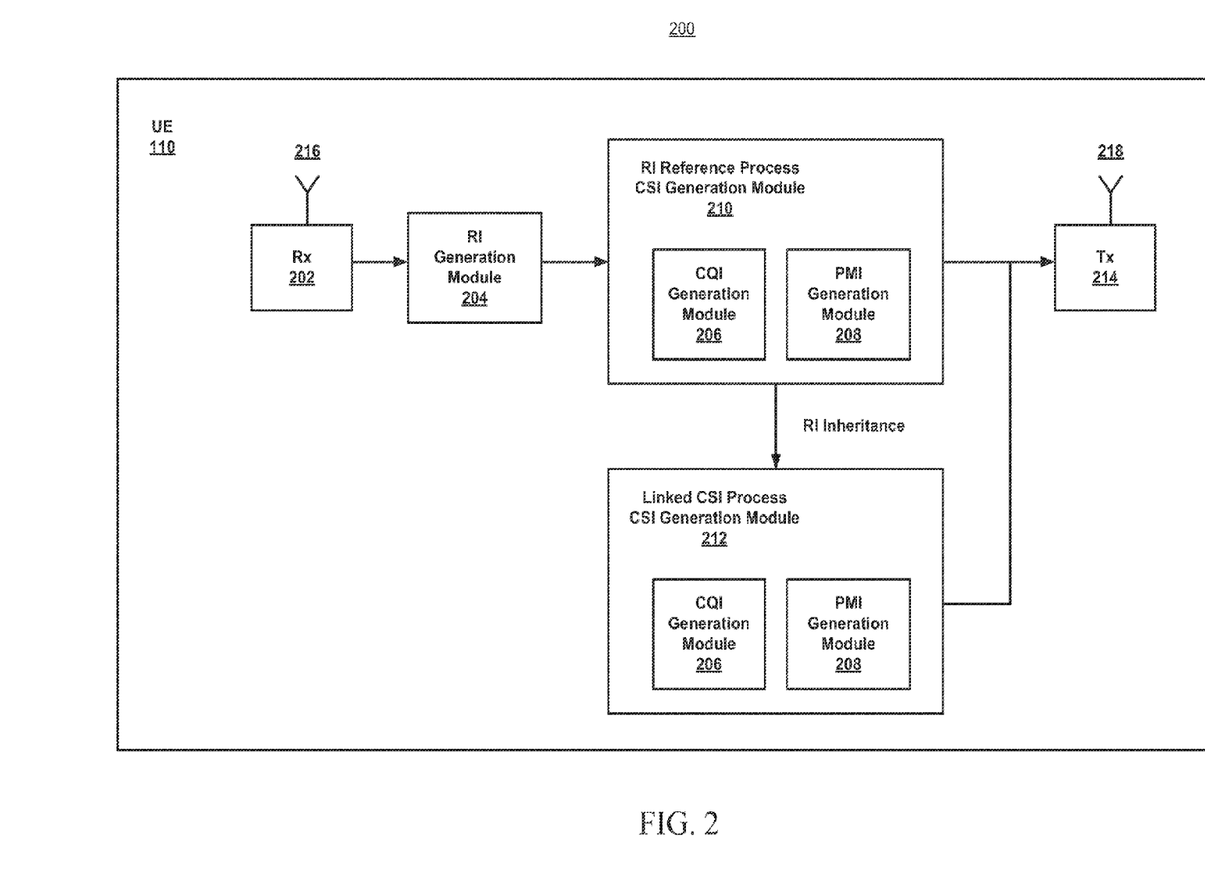
FIG. 2 illustrates a block diagram of one example embodiment consistent with the present disclosure.

FIG. 2 illustrates a block diagram 200 of one example embodiment consistent with the present disclosure. A UE 110 is shown to include a Receiver 202 (and associated antenna 216), an RI generation module 204, an RI Reference Process CSI generation module 210, a Linked CSI Process CSI generation module 212 and a transmitter 214 (and associated antenna 218). The RI Reference Process CSI generation module 210 and Linked CSI Process CSI generation module 212 further include a CQI generation module 206 and a PMI generation module 208.

Receiver 202 may be configured to receive signals (including CSI configuration information) from one or more eNBs through antenna 216 which may be a Multiple Input Multiple Output (MIMO) antenna. RI generation module 204 may be configured to calculate RIs for each of the CSIs of the CSI configuration that the eNB has requested of the UE. An RI indicates the number of symbol streams that may be transmitted simultaneously through separate antennas. Typically, a higher Signal to Interference plus Noise Ratio (SINR) permits a greater RI for improved bandwidth efficiency.

CQI generation module 206 may be configured to measure channel quality or signal strength, relative to interference plus noise, associated with the received signals and based on the selected RI from module 204 (or the inherited RI in the case of the linked CSI process 212). PMI generation module 208 may be configured to generate PMI information, associated with CSI and the received signals, and also based on the selected RI from module 204 (or the inherited RI in the case of the linked CSI process 212). The PMI may be employed to specify how multiple antenna inputs are combined to improve signal quality and/or improve data rate. The RI, CQI and PMI information may be combined into a CSI signal to be provided to the eNBs (generally the serving cell eNB which coordinates with other eNBs through the backhaul links), to improve their transmission scheduling decisions to the UE. The CSI properties will generally vary in response to interference conditions from neighboring eNBs as well as blanking or non-blanking transmission from neighboring eNBs associated with EICIC and CoMP operations. The UE 110 is therefore configured to transmit multiple CSIs to the serving cell eNB so that the eNB has access to the channel characteristics during both interfering and non-interfering conditions.

RI Reference Process CSI generation module 210 may be configured to generate one or more RI reference CSIs which may include a calculated RI from RI generation module 204. Linked CSI Process CSI generation module 212 may be configured to generate one or more linked CSIs which may inherit an RI from RI Reference Process CSI generation module 210. RI inheritance provides for CSI reporting with a common RI corresponding to both blanking and non-blanking conditions to facilitate, for example, frequency-selective blanking on neighboring cell eNBs.

Transmitter 214 may be configured to transmit the reference CSI and linked CSI reports through antenna 218 which may be a Multiple Input Multiple Output (MIMO) antenna. In some embodiments, antennas 216 and 218 may be a common or shared antenna. The transmitter may be configured to transmit the reference and linked CSIs over a Physical Uplink Shared Channel (PUSCH) and the transmission may occur aperiodically in response to a trigger from the serving cell eNB. In some embodiments, the transmitter may be configured to transmit the reference and linked CSIs over a Physical Uplink Control Channel (PUCCH) and the transmission may occur periodically at programmable or pre-determined time intervals.

Figure 3:
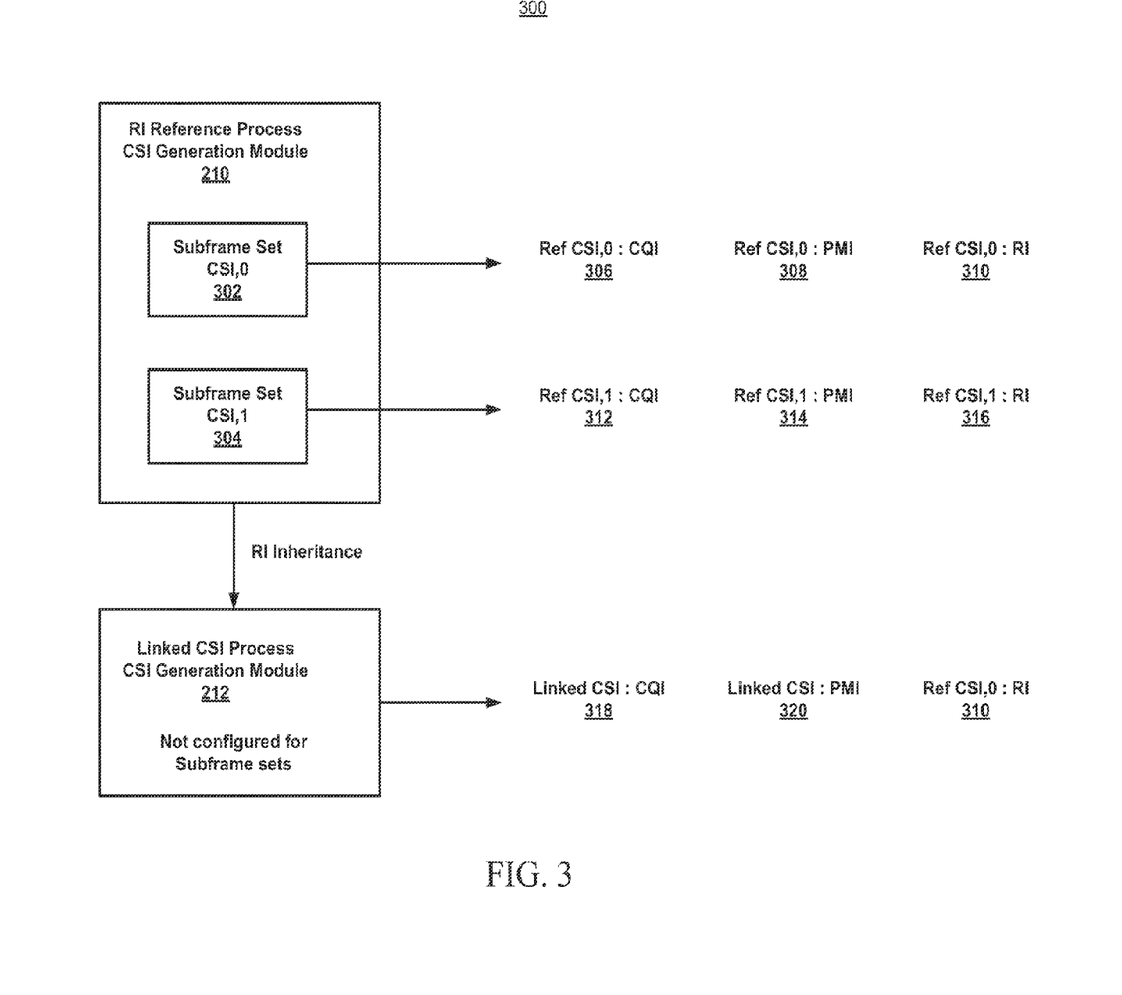
FIG. 3 illustrates a block diagram of another example embodiment consistent with the present disclosure.

FIG. 3 illustrates a block diagram 300 of another example embodiment consistent with the present disclosure. RI Reference Process CSI generation module 210 is configured to generate CSIs for a first subframe set (CSI,0) 302 and a second subframe set (CSI,1) 304. The first subframe set 302 may be associated with a macro cell eNB operating in a non-blanking mode of an EICIC wireless network, and the second subframe set 304 may be associated with a macro cell eNB operating in a blanking mode of an EICIC wireless network. The terms "first" and "second," as used herein with respect to subframes, are intended to distinguish between two sets of subframes rather than to imply or require any ordering between the sets. CSI for subframe set (CSI,0) 302 of RI reference CSI process includes CQI 306, PMI 308 and RI 310. CSI for subframe set (CSI,1) 304 of RI reference CSI process includes CQI 312, PMI 314 and RI 316.

The RI Reference process CSIs may, for example, be associated with time periods where an interfering cell eNB, of the one or more eNBs, is operating in a blanking mode of a CoMP wireless network. In another embodiment, the RI Reference process CSIs may be associated with time periods where an interfering cell eNB, of the one or more eNBs, is operating in a non-blanking mode of a CoMP wireless network.

Linked CSI Process CSI generation module 212, in this embodiment, is not configured for subframe set generation but rather is configured to generate a single linked CSI that includes CQI 318, PMI 320 and RI 310 which is inherited from subframe set (CSI,0) 302 of the RI reference CSI process. The linked process CSI may, for example, be associated with time periods where an interfering cell eNB, of the one or more eNBs, is operating in a non-blanking mode of a CoMP wireless network. In another embodiment, the linked process CSI may be associated with time periods where an interfering cell eNB, of the one or more eNBs, is operating in a blanking mode of a CoMP wireless network.

Figure 4:
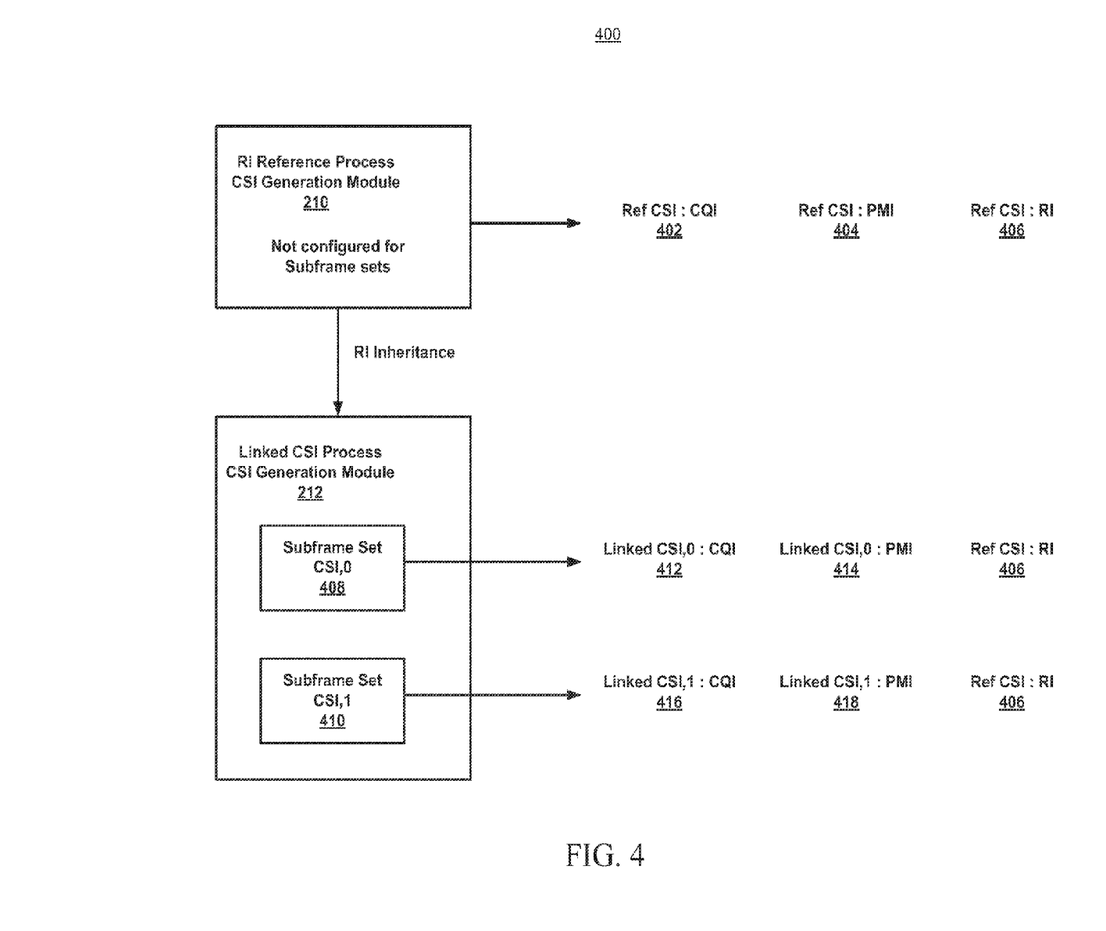
FIG. 4 illustrates a block diagram of another example embodiment consistent with the present disclosure.

FIG. 4 illustrates a block diagram 400 of another example embodiment consistent with the present disclosure. RI Reference Process CSI generation module 210, in this embodiment, is not configured for subframe set generation but rather is configured to generate a single reference CSI that includes CQI 402, PMI 404 and RI 406. The RI Reference process CSI may, for example, be associated with time periods where an interfering cell eNB, of the one or more eNBs, is operating in a blanking mode of a CoMP wireless network. In another embodiment, the RI Reference process CSI may be associated with time periods where an interfering cell eNB, of the one or more eNBs, is operating in a non-blanking mode of a CoMP wireless network.

Linked CSI Process CSI generation module 212, in this embodiment, is configured to generate CSIs for a first subframe set (CSI,0) 408 and a second subframe set (CSI,1) 410. The first subframe set 408 may be associated with a macro cell eNB operating in a non-blanking mode of an EICIC wireless network, and the second subframe set 410 may be associated with a macro cell eNB operating in a blanking mode of an EICIC wireless network. CSI for subframe set (CSI,0) 408 of linked CSI process 212 includes CQI 412, PMI 414 and RI 406 which is inherited from the reference CSI generated by module 210. CSI for subframe set (CSI,1) 410 of linked CSI process 212 includes CQI 416, PMI 418 and RI 406 which is also inherited from the reference CSI generated by module 210.

The linked process CSIs may, for example, be associated with time periods where an interfering cell eNB, of the one or more eNBs, is operating in a non-blanking mode of a CoMP wireless network. In another embodiment, the linked process CSIs may be associated with time periods where an interfering cell eNB, of the one or more eNBs, is operating in a blanking mode of a CoMP wireless network.

Figure 5:
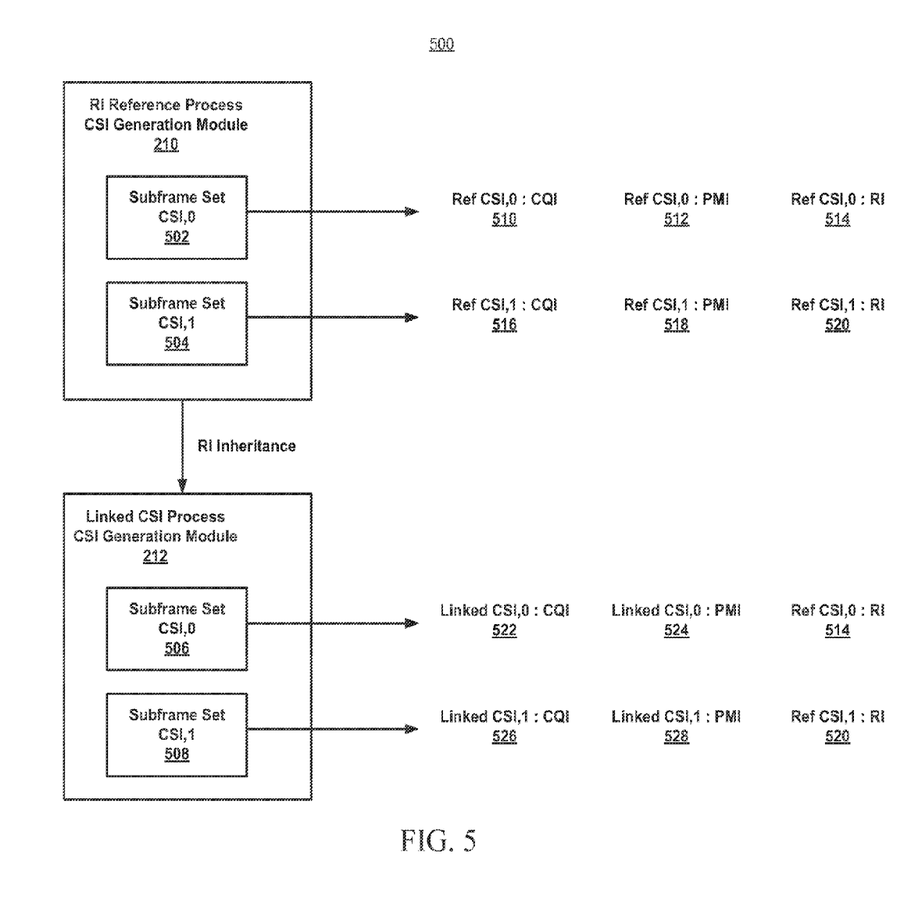
FIG. 5 illustrates a block diagram of another example embodiment consistent with the present disclosure.

FIG. 5 illustrates a block diagram 500 of another example embodiment consistent with the present disclosure. RI Reference Process CSI generation module 210 is configured to generate CSIs for a first subframe set (CSI,0) 502 and a second subframe set (CSI,1) 504. The first subframe set 502 may be associated with a macro cell eNB operating in a non-blanking mode of an EICIC wireless network, and the second subframe set 504 may be associated with a macro cell eNB operating in a blanking mode of an EICIC wireless network. CSI for subframe set (CSI,0) 502 of RI reference CSI process 210 includes CQI 510, PMI 512 and RI 514. CSI for subframe set (CSI,1) 504 of RI reference CSI process 210 includes CQI 516, PMI 518 and RI 520.

The RI Reference process CSIs may, for example, be associated with time periods where an interfering cell eNB, of the one or more eNBs, is operating in a blanking mode of a CoMP wireless network. In another embodiment, the RI Reference process CSIs may be associated with time periods where an interfering cell eNB, of the one or more eNBs, is operating in a non-blanking mode of a CoMP wireless network.

Linked CSI Process CSI generation module 212, in this embodiment, is configured to generate CSIs for a first subframe set (CSI,0) 506 and a second subframe set (CSI,1) 508. The first subframe set 506 may be associated with a macro cell eNB operating in a non-blanking mode of an EICIC wireless network, and the second subframe set 508 may be associated with a macro cell eNB operating in a blanking mode of an EICIC wireless network. CSIs for subframe set (CSI,0) 506 of linked CSI process includes CQI 522, PMI 524 and RI 514 which is inherited from the first subframe set of the reference CSI generated by module 210. CSIs for subframe set (CSI,1) 508 of linked CSI process includes CQI 526, PMI 528 and RI 520 which is inherited from the second subframe set of the reference CSI generated by module 210.

The linked process CSIs may, for example, be associated with time periods where an interfering cell eNB, of the one or more eNBs, is operating in a non-blanking mode of a CoMP wireless network. In another embodiment, the linked process CSIs may be associated with time periods where an interfering cell eNB, of the one or more eNBs, is operating in a blanking mode of a CoMP wireless network.

The embodiment described above in connection with FIG. 5 may also be employed as a default operation in other embodiments where the eNB does not provide CSI configuration information to the UE.

Figure 6:
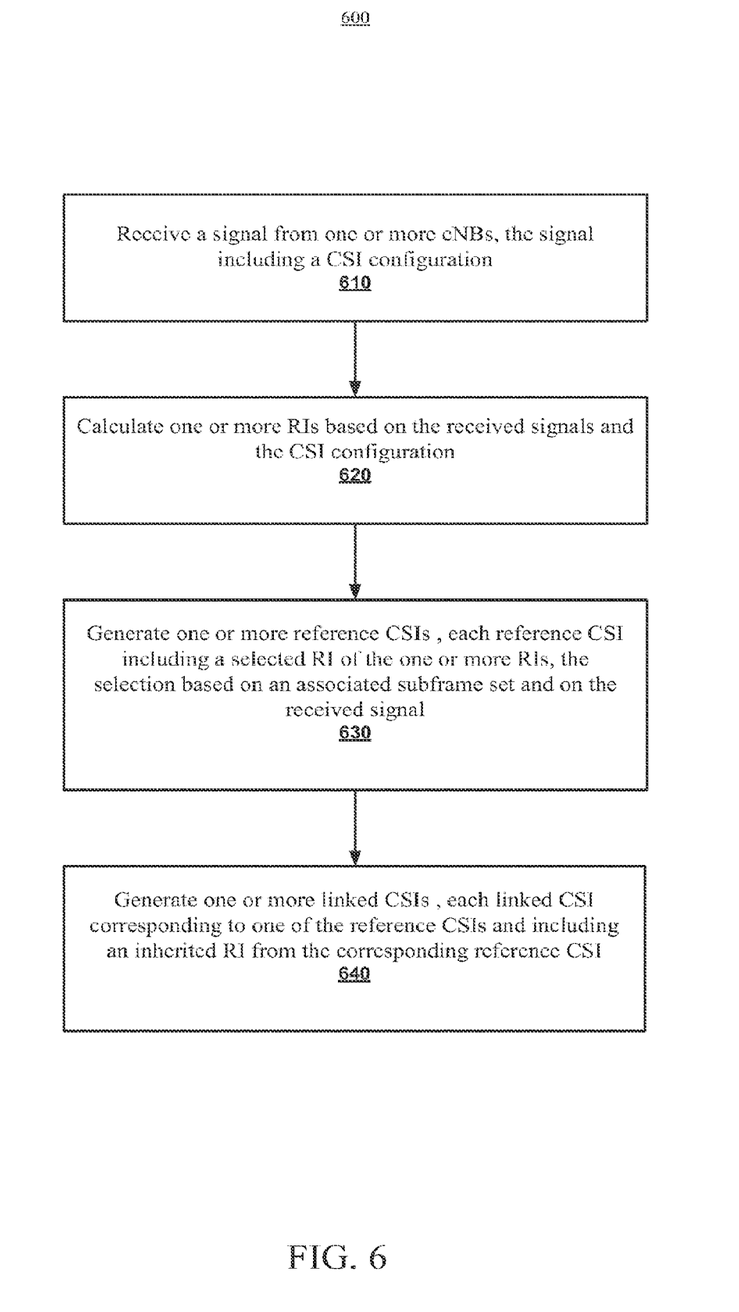
FIG. 6 illustrates a flowchart of operations of another example embodiment consistent with the present disclosure.

FIG. 6 illustrates a flowchart of operations 600 of another example embodiment consistent with the present disclosure. At operation 610, a signal is received from one or more eNBs. The signal includes a CSI configuration. At operation 620, one or more RIs are calculated based on the received signals and the CSI configuration. At operation 630, one or more reference CSIs are generated, each reference CSI including a selected RI of the one or more RIs, the selection based on an associated subframe set and further based on the received signal. The reference CSIs may be generated by a reference CSI process of a UE. At operation 640, one or more linked CSIs are generated, each linked CSI corresponding to one of the reference CSIs and including an inherited RI from the corresponding reference CSI. The linked CSIs may be generated by a linked CSI process of the UE. The linked CSI includes a CQI and PMI that are calculated based on the inherited RI from the reference CSI process.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, methods, systems and computer-readable storage medium for subframe restricted CSI reporting with RI inheritance. The following examples pertain to further embodiments.

According to one aspect there is provided a UE. The UE may include a Rank Indicator (RI) generation module to generate one or more RIs based on a received Channel State Information (CSI) configuration from an evolved Node B (eNB) of a serving cell of the UE. The UE of this example may also include an RI Reference Process CSI generation module to generate a first reference CSI including a first selected RI of the one or more RIs, the first selection based on a first subframe set of the received CSI configuration, and to generate a second reference CSI including a second selected RI of the one or more RIs, the second selection based on a second subframe set of the received CSI configuration. The UE of this example may further include a Linked Process CSI generation module to generate a linked CSI including an inherited RI from the first reference CSI.

Another example UE includes the forgoing components and the Linked Process CSI generation module further includes a Channel Quality Indicator (CQI) generation module to generate a CQI based on the inherited RI and a Pre-Coding Matrix Indicator (PMI) generation module to generate a PMI based on the inherited RI.

Another example UE includes the forgoing components and the first subframe set is associated with a macro cell eNB operating in a non-blanking mode and the second subframe set is associated with the macro cell eNB operating in a blanking mode.

Another example UE includes the forgoing components and the blanking and non-blanking modes are employed in an Enhanced Inter-Cell Interference Coordination (EICIC) wireless network.

Another example UE includes the forgoing components and the RI Reference Process CSI is associated with time periods during which an interfering cell eNB, is operating in a blanking mode and the Linked Process CSI is associated with time periods during which the interfering cell eNB is operating in a non-blanking mode.

Another example UE includes the forgoing components and the blanking and non-blanking modes are employed in a Coordinated Multipoint (CoMP) wireless network.

Another example UE includes the forgoing components and further includes a transmitter circuit to transmit the first reference CSI, the second reference CSI and the linked CSI to the serving cell eNB over a Physical Uplink Shared Channel (PUSCH), the transmission occurring aperiodically in response to a trigger from the serving cell eNB.

Another example UE includes the forgoing components and further includes a transmitter circuit to transmit the first reference CSI, the second reference CSI and the linked CSI to the serving cell eNB over a Physical Uplink Control Channel (PUCCH), the transmission occurring periodically at programmable intervals.

According to another aspect there is provided a UE. The UE may include a Rank Indicator (RI) generation module to generate one or more RIs based on a received Channel State Information (CSI) configuration from an evolved Node B (eNB) of a serving cell of the UE. The UE of this example may also include an RI Reference Process CSI generation module to generate a reference CSI including a selected RI of the one or more RIs. The UE of this example may further include a Linked Process CSI generation module to generate a first linked CSI, associated with a first subframe set of the received CSI configuration, including an inherited RI from the reference CSI, and to generate a second linked CSI, associated with a second subframe set of the received CSI configuration, including the inherited RI from the reference CSI.

Another example UE includes the forgoing components and the Linked Process CSI generation module further includes a Channel Quality Indicator (CQI) generation module to generate a CQI based on the inherited RI and a Pre-Coding Matrix Indicator (PMI) generation module to generate a PMI based on the inherited RI.

Another example UE includes the forgoing components and the first subframe set is associated with a macro cell eNB operating in a non-blanking mode and the second subframe set is associated with the macro cell eNB operating in a blanking mode.

Another example UE includes the forgoing components and the blanking and non-blanking modes are employed in an Enhanced Inter-Cell Interference Coordination (EICIC) wireless network.

Another example UE includes the forgoing components and the RI Reference Process CSI is associated with time periods during which an interfering cell eNB is operating in a blanking mode and the Linked Process CSI is associated with time periods during which the interfering cell eNB is operating in a non-blanking mode.

Another example UE includes the forgoing components and the blanking and non-blanking modes are employed in a Coordinated Multipoint (CoMP) wireless network.

Another example UE includes the forgoing components and further includes a transmitter circuit to transmit the reference CSI, the first linked CSI and the second linked CSI to the serving cell eNB over a Physical Uplink Shared Channel (PUSCH), the transmission occurring aperiodically in response to a trigger from the serving cell eNB.

Another example UE includes the forgoing components and further includes a transmitter circuit to transmit the reference CSI, the first linked CSI and the second linked CSI to the serving cell eNB over a Physical Uplink Control Channel (PUCCH), the transmission occurring periodically at programmable intervals.

According to another aspect there is provided a UE. The UE may include a Rank Indicator (RI) generation module to generate one or more RIs based on a received Channel State Information (CSI) configuration from an evolved Node B (eNB) of a serving cell of the UE. The UE of this example may also include an RI Reference Process CSI generation module to generate a first reference CSI including a first selected RI of the one or more RIs, the first selection based on a first subframe set of the received CSI configuration, and to generate a second reference CSI including a second selected RI of the one or more RIs, the second selection based on a second subframe set of the received CSI configuration. The UE of this example may further include a Linked Process CSI generation module to generate a first linked CSI, associated with the first subframe set of the received CSI configuration, including an inherited RI from the first reference CSI, and to generate a second linked CSI, associated with the second subframe set of the received CSI configuration, including an inherited RI from the second reference CSI.

Another example UE includes the forgoing components and the Linked Process CSI generation module further includes a Channel Quality Indicator (CQI) generation module to generate a CQI based on the inherited RI and a Pre-Coding Matrix Indicator (PMI) generation module to generate a PMI based on the inherited RI.

Another example UE includes the forgoing components and the first subframe set is associated with a macro cell eNB operating in a non-blanking mode and the second subframe set is associated with the macro cell eNB operating in a blanking mode.

Another example UE includes the forgoing components and the blanking and non-blanking modes are employed in an Enhanced Inter-Cell Interference Coordination (EICIC) wireless network.

Another example UE includes the forgoing components and the RI Reference Process CSI is associated with time periods during which an interfering cell eNB is operating in a blanking mode and the Linked Process CSI is associated with time periods during which the interfering cell eNB is operating in a non-blanking mode.

Another example UE includes the forgoing components and the blanking and non-blanking modes are employed in a Coordinated Multipoint (CoMP) wireless network.

Another example UE includes the forgoing components and further includes a transmitter circuit to transmit the first reference CSI, the second reference CSI, the first linked CSI and the second linked CSI to the serving cell eNB over a Physical Uplink Shared Channel (PUSCH), the transmission occurring aperiodically in response to a trigger from the serving cell eNB.

Another example UE includes the forgoing components and further includes a transmitter circuit to transmit the first reference CSI, the second reference CSI, the first linked CSI and the second linked CSI to the serving cell eNB over a Physical Uplink Control Channel (PUCCH), the transmission occurring periodically at programmable intervals.

According to another aspect there is provided a method. The method may include receiving a signal from one or more evolved Node Bs (eNBs), the signal including a Channel State Information (CSI) configuration. The method of this example may also include calculating one or more Rank Indicators (RIs) based on the received signals and the CSI configuration. The method of this example may further include generating one or more reference CSIs, each reference CSI including a selected RI of the one or more RIs, the selection based on an associated subframe set and further based on the received signals. The method of this example may further include generating one or more linked CSIs, each linked CSI corresponding to one of the reference CSIs and including an inherited RI from the corresponding reference CSI.

Another example method includes the forgoing operations and the Linked CSIs further include a Channel Quality Indicator (CQI) based on the inherited RI and a Pre-Coding Matrix Indicator (PMI) based on the inherited RI.

Another example method includes the forgoing operations and one of the associated subframe sets is associated with a macro cell eNB operating in a non-blanking mode and another of the associated subframe sets is associated with the macro cell eNB operating in a blanking mode.

Another example method includes the forgoing operations and the blanking and non-blanking modes are employed in an Enhanced Inter-Cell Interference Coordination (EICIC) wireless network.

Another example method includes the forgoing operations and the reference CSI signals are associated with time periods during which an interfering cell eNB is operating in a blanking mode and the linked CSI signals are associated with time periods during which the interfering cell eNB is operating in a non-blanking mode.

Another example method includes the forgoing operations and the blanking and non-blanking modes are employed in a Coordinated Multipoint (CoMP) wireless network.

Another example method includes the forgoing operations and further includes transmitting the reference CSI signals and the linked CSI signals to the serving cell eNB over a Physical Uplink Shared Channel (PUSCH), the transmission occurring aperiodically in response to a trigger from the serving cell eNB.

Another example method includes the forgoing operations and further includes transmitting the reference CSI signals and the linked CSI signals to the serving cell eNB over a Physical Uplink Control Channel (PUCCH), the transmission occurring periodically at programmable intervals.

According to another aspect there is provided a system. The system may include a means for receiving a signal from one or more evolved Node Bs (eNBs), the signal including a Channel State Information (CSI) configuration. The system of this example may also include a means for calculating one or more Rank Indicators (RIs) based on the received signals and the CSI configuration. The system of this example may further include a means for generating one or more reference CSIs, each reference CSI including a selected RI of the one or more RIs, the selection based on an associated subframe set and further based on the received signals. The system of this example may further include a means for generating one or more linked CSIs, each linked CSI corresponding to one of the reference CSIs and including an inherited RI from the corresponding reference CSI.

Another example system includes the forgoing components and the Linked CSIs further include a Channel Quality Indicator (CQI) based on the inherited RI and a Pre-Coding Matrix Indicator (PMI) based on the inherited RI.

Another example system includes the forgoing components and one of the associated subframe sets is associated with a macro cell eNB operating in a non-blanking mode and another of the associated subframe sets is associated with the macro cell eNB operating in a blanking mode.

Another example system includes the forgoing components and the blanking and non-blanking modes are employed in an Enhanced Inter-Cell Interference Coordination (EICIC) wireless network.

Another example system includes the forgoing components and the reference CSI signals are associated with time periods during which an interfering cell eNB is operating in a blanking mode and the linked CSI signals are associated with time periods during which the interfering cell eNB is operating in a non-blanking mode.

Another example system includes the forgoing components and the blanking and non-blanking modes are employed in a Coordinated Multipoint (CoMP) wireless network.

Another example system includes the forgoing components and further includes a means for transmitting the reference CSI signals and the linked CSI signals to the serving cell eNB over a Physical Uplink Shared Channel (PUSCH), the transmission occurring aperiodically in response to a trigger from the serving cell eNB.

Another example system includes the forgoing components and further includes a means for transmitting the reference CSI signals and the linked CSI signals to the serving cell eNB over a Physical Uplink Control Channel (PUCCH), the transmission occurring periodically at programmable intervals.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. User Equipment (UE) to mitigate inter-cell interference, comprising:
   Rank Indicator (RI) generation circuitry to generate one or more RIs based on a received Channel State Information (CSI) configuration from an evolved Node B (eNB) of a serving cell of said UE;
   RI Reference Process CSI generation circuitry to generate a first reference CSI comprising a first selected RI of said one or more RIs, said first selection based on a first subframe set of said received CSI configuration, and to generate a second reference CSI comprising a second selected RI of said one or more RIs, said second selection based on a second subframe set of said received CSI configuration;
   Linked Process CSI generation circuitry to periodically generate a linked CSI comprising an inherited RI from said first reference CSI, said Linked Process CSI generation circuitry further comprising Channel Quality Indicator (CQI) generation circuitry to measure channel quality and signal strength, relative to interference plus noise, associated with received signals and generate a CQI based on said signal measurements and said inherited RI; and
   a transmission circuit to transmit at least said RI, CSI and CQI to a network controller for a network including at least said UE for use in mitigating said inter-cell interference.

2. The UE of claim 1, wherein said Linked Process CSI generation circuitry further comprises a Pre-Coding Matrix Indicator (PMI) generation circuitry to generate a PMI based on said inherited RI.

3. The UE of claim 1, wherein said first subframe set is associated with a macro cell eNB operating in a non-blanking mode and said second subframe set is associated with said macro cell eNB operating in a blanking mode.

4. The UE of claim 3, wherein said blanking and non-blanking modes are employed in an Enhanced Inter-Cell Interference Coordination (EICIC) wireless network.

5. The UE of claim 3, wherein said blanking and non-blanking modes are employed in a Coordinated Multipoint (CoMP) wireless network.

6. The UE of claim 1, wherein said transmitter circuit is to transmit said first reference CSI, said second reference CSI and said linked CSI to said serving cell eNB over a Physical Uplink Shared Channel (PUSCH), said transmission occurring aperiodically in response to a trigger from said serving cell eNB.

7. The UE of claim 1, wherein said transmitter circuit is to transmit said first reference CSI, said second reference CSI and said linked CSI to said serving cell eNB over a Physical Uplink Control Channel (PUCCH), said transmission occurring periodically at programmable intervals.

8. User Equipment (UE) to mitigate inter-cell interference, comprising:
   Rank Indicator (RI) generation circuitry to generate one or more RIs based on a received Channel State Information (CSI) configuration from an evolved Node B (eNB) of a serving cell of said UE;
   RI Reference Process CSI generation circuitry to generate a reference CSI comprising a selected RI of said one or more RIs;
   Linked Process CSI generation circuitry to periodically generate a first linked CSI, associated with a first subframe set of said received CSI configuration, comprising an inherited RI from said reference CSI, and to generate a second linked CSI, associated with a second subframe set of said received CSI configuration, comprising said inherited RI from said reference CSI, said Linked Process CSI generation circuitry further comprising Channel Quality Indicator (CQI) generation circuitry to measure channel quality and signal strength, relative to interference plus noise, associated with received signals and generate a CQI based on said signal measurements and said inherited RI; and
   a transmission circuit to transmit at least said RI, first linked CSI, second linked CSI and CQI to a network controller for a network including at least said UE for use in mitigating said inter-cell interference.

9. The UE of claim 8, wherein said Linked Process CSI generation circuitry further comprises Pre-Coding Matrix Indicator (PMI) generation circuitry to generate a PMI based on said inherited RI.

10. The UE of claim 8, wherein said first subframe set is associated with a macro cell eNB operating in a non-blanking mode and said second subframe set is associated with said macro cell eNB operating in a blanking mode.

11. The UE of claim 10, wherein said blanking and non-blanking modes are employed in an Enhanced Inter-Cell Interference Coordination (EICIC) wireless network.

12. The UE of claim 8, wherein said RI Reference Process CSI is associated with time periods during which an interfering cell eNB is operating in a blanking mode and said Linked Process CSI is associated with time periods during which said interfering cell eNB is operating in a non-blanking mode.

13. The UE of claim 12, wherein said blanking and non-blanking modes are employed in a Coordinated Multipoint (CoMP) wireless network.

14. The UE of claim 8, wherein said transmitter circuit is to transmit said reference CSI, said first linked CSI and said second linked CSI to said serving cell eNB over a Physical Uplink Shared Channel (PUSCH), said transmission occurring aperiodically in response to a trigger from said serving cell eNB.

15. The UE of claim 8, wherein said transmitter circuit is to transmit said reference CSI, said first linked CSI and said second linked CSI to said serving cell eNB over a Physical Uplink Control Channel (PUCCH), said transmission occurring periodically at programmable intervals.

16. User Equipment (UE) to mitigate inter-cell interference, comprising:
   Rank Indicator (RI) generation circuitry to generate one or more RIs based on a received Channel State Information (CSI) configuration from an evolved Node B (eNB) of a serving cell of said UE;
   RI Reference Process CSI generation circuitry to generate a first reference CSI comprising a first selected RI of said one or more RIs, said first selection based on a first subframe set of said received CSI configuration, and to generate a second reference CSI comprising a second selected RI of said one or more RIs, said second selection based on a second subframe set of said received CSI configuration;

Linked Process CSI generation circuitry to periodically generate a first linked CSI, associated with said first subframe set of said received CSI configuration, comprising an inherited RI from said first reference CSI, and to generate a second linked CSI, associated with said second subframe set of said received CSI configuration, comprising an inherited RI from said second reference CSI, said Linked Process CSI generation circuitry further comprising Channel Quality Indicator (CQI) generation circuitry to measure channel quality and signal strength, relative to interference plus noise, associated with received signals and generate a CQI based on said signal measurements and said inherited RI; and a transmission circuit to transmit at least said RI, first linked CSI, second linked CSI and CQI to a network controller for a network including at least said UE for use in mitigating said inter-cell interference.

17. The UE of claim 16, wherein said Linked Process CSI generation circuitry further comprises a Pre-Coding Matrix Indicator (PMI) generation circuitry to generate a PMI based on said inherited RI.

18. The UE of claim 16, wherein said first subframe set is associated with a macro cell eNB operating in a non-blanking mode and said second subframe set is associated with said macro cell eNB operating in a blanking mode.

19. The UE of claim 18, wherein said blanking and non-blanking modes are employed in an Enhanced Inter-Cell Interference Coordination (EICIC) wireless network.

20. The UE of claim 16, wherein said RI Reference Process CSI is associated with time periods during which an interfering cell eNB is operating in a blanking mode and said Linked Process CSI is associated with time periods during which said interfering cell eNB is operating in a non-blanking mode.

21. The UE of claim 20, wherein said blanking and non-blanking modes are employed in a Coordinated Multi-point (CoMP) wireless network.

22. The UE of claim 16, wherein said transmitter circuit is to transmit said first reference CSI, said second reference CSI, said first linked CSI and said second linked CSI to said serving cell eNB over a Physical Uplink Shared Channel (PUSCH), said transmission occurring aperiodically in response to a trigger from said serving cell eNB.

23. The UE of claim 16, wherein said transmitter circuit is to transmit said first reference CSI, said second reference CSI, said first linked CSI and said second linked CSI to said serving cell eNB over a Physical Uplink Control Channel (PUCCH), said transmission occurring periodically at programmable intervals.

24. A method to mitigate inter-cell interference, comprising:

receiving a signal from one or more evolved Node Bs (eNBs), said signal comprising a Channel State Information (CSI) configuration;

calculating one or more Rank Indicators (RIs) based on said received signals and said CSI configuration;

generating one or more reference CSIs, each reference CSI comprising a selected RI of said one or more RIs, said selection based on an associated subframe set and further based on said received signals;

periodically generating one or more linked CSIs, each linked CSI corresponding to one of said reference CSIs and comprising an inherited RI from said corresponding reference CSI;

measuring channel quality and signal strength, relative to interference plus noise, associated with received signals;

generating a CQI based on said signal measurements and said inherited RI; and transmitting at least said RI, one or more linked CSIs and CQI for use in mitigating said inter-cell interference.

* * * * *